Patented Sept. 7, 1954

2,688,571

UNITED STATES PATENT OFFICE 2,688,571

WATER-RESISTANT NONFIBROUS REGENERATED CELLULOSE AND PROCESS OF PRODUCING THE SAME

William M. Wooding, Springdale, Conn., assignor to American Cyanamid Company, New York, N. Y., a corporation of Maine No Drawing. Application February 24, 1951, Serial No. 212,702

19 Claims. (Cl. 117—76)

This invention relates to a process for treating non-fibrous cellulosic films in order to improve the bonding of the subsequently-applied topcoats thereto. More specifically, this invention relates to the process of treating non-fibrous regenerated cellulosic films with an urea-formaldehyde-ammonia-difunctional halohydrin resin in an aqueous dispersion in a softening bath, removing the film from the bath, drying the film, thereby partially curing the affixed resin, and applying the water-repellent topcoat thereto.

The object of the present invention is to improve the bonding of water-repellent topcoats to regenerated cellulosic films in order that their application and use commercially can be expanded to fields other than those already tried and to those applications which, having been tried, have not proven to be successful.

A further object of the present invention is to improve the bonding of the topcoat to the regenerated cellulosic films to such a degree that water immersion for prolonged periods does not materially affect said bonding, nor does it result in the separation of the topcoat from the regenerated cellulosic film base.

A still further object of the present invention is to produce regenerated cellulosic films having such marked improvement in water-repellency, when treated in accordance with the process of the present invention, that they will have much greater application as wrapping materials, particularly when used for the purpose of packaging moist foods, such as fish, cheese, and the like, and frozen foods, such as frozen vegetables, frozen berries and other fruits, and the like.

These and other objects of the present invention will be discussed more fully hereinbelow.

Non-fibrous regenerated cellulosic films have been found utilizable for the packaging of many products which, in the course of storage, shipment and display, must be subjected to moist atmospheric conditions and, as a consequence, the water-repellent topcoats which have been attached to the regenerated cellulosic film bases, tend to slough off, even after brief exposure to moist atmospheric conditions. This factor has limited somewhat the expansion of the use of the regenerated cellulosic films in additional fields, because of this defective characteristic. Considerable work has been done in the field in an endeavor to produce an anchoring agent which will securely bond the water-repellent topcoat to the regenerated cellulosic film base, so that these cellulosic films, when so treated, may be subjected to moist atmospheric conditions and even water immersion for prolonged periods of time while still remaining intact and continuing to provide the necessary protection which the packaged products require.

In order that the present invention may be completely understood, the following examples are set forth. These examples are set forth solely for the purpose of illustration and should not be interpreted as a limitation on the case, except as indicated in the appended claims.

Example 1

A 1% aqueous dispersion of an urea-formaldehyde-epichlorohydrin-ammonia cationic resin is prepared and a strip of wet, swollen, non-fibrous cellulosic film is immersed therein for a period of about 5–10 minutes. The film is removed from the resin dispersion and is then immersed in a plasticizing bath, removed therefrom and dried for about 10 minutes at 200° F. on a drying frame. It is desirable to secure the film in order that there be no shrinking during the drying operation. The film is then coated with a water-repellent topcoat and then subjected to a water immersion test for an extended period of time. The water immersion test referred to hereinabove is an accelerated test, which is accomplished by subjecting the treated film to immersion in water, the temperature of which is controlled between 180–190° F., until the topcoat sloughs from the film base. The film is immersed in the water and is removed at approximately five minute intervals and examined for blisters and sloughing.

After this particular film, treated in accordance with Example 1, hereinabove, was immersed for more than sixty minutes, it was removed and examined and found to indicate no signs of blistering or sloughing of the topcoat from the film base. It was considered unnecessary to continue the test beyond the sixty minute period, as that amount of water resistance was considered more than adequate, in view of the comparatively high temperature of the water. Furthermore, it should be noted that commercially-used cellophane or regenerated cellulosic film anchoring agents produced results which were no better than that which the instant resin produced and, in some instances, were actually poorer. Test strips of the cellulosic films were prepared, wherein no resin was impregnated into the film but the film itself was coated with a water-repellent topcoat and subjected to the same type of accelerated immersion test and it was found, in one instance, that the water-resistant topcoat sloughed off completely in one minute and fifteen seconds, whereas other test films sloughed off completely in one minute.

Example 2

A 1% aqueous dispersion of an urea-formaldehyde dihalohydrin-ammonia cationic resin is prepared and a wet strip of swollen, non-fibrous cellulosic film is immersed therein in a manner comparable to that set forth in Example 1. After the water-repellent topcoat has been applied, the film is then subjected to the water immersion test, defined hereinabove, and it is found again that the resistance to sloughing extends beyond the sixty mixture period tested. Other samples of the regenerated cellulosic film are treated in a manner comparable to that set forth in the process of Examples 1 and 2, but in which the concentration of the resin in the aqueous dispersion is varied between about 0.01–5%. It is found that, although good bonding can be accomplished in the very low concentrations, that it is generally desirable to have at least 0.1% of the resin present and it is further found that when amounts of resin over and beyond about 3% by weight based on the total weight of the resin aqueous dispersion are used, results are not markedly improved as an optimum appears to have been reached.

In the practice of the process of the present invention, it is desirable to introduce the cellulosic films into the aqueous resin dispersion in a wet, swollen condition. Generally, in the manufacture of the finished moisture-resistant films, if the steps from the manufacture of the film itself, through the subsequent treatment of the film with the resin dispersion are continuous, the film is introduced into the aqueous resin dispersion directly in a wet and swollen condition. On the other hand, if the steps from the production of the film to the treatment of the film are not continuous, it will be necesary to subject the film to immersion in an aqueous bath in order to bring the film into a wet and reswollen state. There are a number of different modifications of the process of treating the films in accordance with the practice of this invention and, for the sake of clarity, a number of these different methods will be enumerated hereinbelow.

One of the preferred embodiments of the instant invention will be to introduce the wet, swollen film into the aqueous resin dispersion, into which a plasticizing agent has been incorporated. The period of time during which the film should be immersed in the aqueous dispersion of the resin is about 2–10 minutes. The film is then removed from the resin-plasticizer bath and passed through a drying chamber, which serves not only to remove the moisture from the film but serves further to partially polymerize the resin on and in the film itself. At this point, the topcoat may be applied directly, or the film may be rolled up and stored for subsequent treatment by the application of the moisture resistant topcoat.

A further modification of the present invention is to introduce the wet, swollen cellulosic film into an aqueous dispersion of the resin, remove the film from the resin bath, introduce the film into a separate plasticizing bath, whereupon it may be removed, dried, coated or alternatively rolled up without coating for storage purposes.

A still further modification of the process itself may be accomplished by introducing the wet, swollen film into the aqueous resin dispersion and, upon removal therefrom, the film may be subjected to a washing step to remove any excess resin which may have become impregnated in the surface of the film. (This step is generally advisable when the concentration of resin in the aqueous dispersion is high.) The film is then removed from the washing bath and introduced into the plasticizing bath, from which it is subsequently removed, dried and coated with the moisture-resistant coating in the same manner as indicated hereinabove.

A still further modification of the process itself may be accomplished by spraying the wet, swollen film with an aqueous dispersion of the resin, partially drying the film, subjecting the film to treatment in a plasticizing bath and, upon removal therefrom, a second and more complete drying step may be accomplished, whereupon the film is ready for the application of the moisture-resistant topcoat.

There are further modifications to the general process itself, which will be obvious to anyone skilled in the art, and each of these modifications is intended to be within the scope of the present invention.

When the process of the present invention is practiced, it is preferred to make use of a plasticizing agent, as indicated hereinabove. The plasticizing, or softening, agents, which one may use in the practice of the process of this invention, are compounds such as the water-soluble polyhydric alcohols, such as ethylene glycol, glycerol, dipropylene glycol, and the like; the water-soluble ureas such as urea, thiourea and the like.

It is preferred that the plasticizing bath be an aqueous solution of a soluble polyhydric alcohol of comparatively low concentration; that is, about 8%. Glycerol itself is actually the preferred plasticizing agent. By increasing the concentration of the polyhydric alcohol in the softening bath, no appreciable difference in results is to be noted, even when the concentration of the alcohol is increased to double that previously indicated. The minimum percentage of the polyhydric alcohol in the softening bath should not be appreciably less than about 2% for best results. In the treatment of the non-fibrous regenerated cellulosic films, the step of immersing the film in the plasticizing bath may be accomplished either before immersion in the aqueous resin dispersion or the plasticizing agent may be incorporated in the aqueous resin dispersion or the immersion in the plasticizing bath may be accomplished subsequent to the immersion in the aqueous resin dispersion.

The thermosetting resins which are used in the practice of the process of the present invention may be prepared in a variety of ways, such as by the reaction of ammonia with a difunctional halohydrin to produce an ammonia halohydrin cationic resin. This resin may then be coreacted with urea and formaldehyde to produce the resin useful in the present invention. It is generally preferred to prepare the ammonia halohydrin resin portion of the final resinous composition first, as this reaction is accomplished under alkaline conditions due directly, of course, to the presence of the ammonia in the reaction system. The preparation of the final resinous material, however, wherein the urea-formaldehyde and ammonia-halohydrin resins are coreacted is generally and preferably accomplished under acid conditions and may be produced either by reacting the components at a pH between about 1-4, or even between 4-7. When one reacts the two components at a pH between 1-4, one can heat the reaction mixture at reflux temperatures for about one hour and then, by cooling to temperatures between about room temperature and about 70° C., one is able to realize increased viscosity in the resin syrup. However, if one elects to use pH values of between 4-7, or more particularly between 5-6, it is necessary to continue the heating at reflux, in order to experience the increased viscosity desired.

In order to illustrate some of these concepts, the following examples are set forth, in which all parts are parts by weight. It should be remembered that these examples are set forth solely for the purpose if illustration and should not be interpreted as limitations on the case, except as indicated in the appended claims.

*Resin component A*

65 parts of an aqueous ammonia solution 27% NH₃) are charged into a suitable reaction chamber equipped with thermometer, stirrer and reflux condenser. 186 parts of epichlorohydrin are added gradually thereto, dropwise. The exothermic reaction is controlled at about 30-40° C. and thereafter the mixture is heated on a steam bath for about 1-2 hours. The reaction mixture is then cooled to about 15-20° C. and 60 parts of an aqueous 50% sodium hydroxide solution are added and the mixture is allowed to stand for fifteen minutes.

*Resin component B*

65 parts of a 27% aqueous ammonia solution and 240 parts of a 50% sodium hydroxide solution are introduced into a suitable reaction chamber equipped with thermometer, stirrer and reflux condenser and 387 parts of dichlorohydrin are added gradually thereto. The exothermic reaction which develops should be controlled at about 35-40° C. until said reaction is substantially completed. The reaction mixture is then heated on a steam bath for about 1-2 hours. The reaction mixture is then removed from the steam bath and cooled to about 15-20° C. 240 parts of a 50% solution of sodium hydroxide is again added to the reaction mixture and the mixture is allowed to remain standing for about 15 minutes.

The ammonia-halohydrin resins used in the modification of the urea-formaldehyde resins of the present invention may be prepared by reacting ammonia and the halohydrin in mol ratios varying between 2:1-1:5, respectively. It is actually preferred, however, that the mol ratio of ammonia to halohydrin be within the range of 1:1.5-1:3.0, respectively. By use of the term "difunctional halohydrin," the epihalohydrins and the dihalohydrins are included. Amongst the epihalohydrins which can be used with ammonia to form the initial reaction product for use in the preparation of the final urea-formaldehyde modified resin, are included the epichlorohydrin, epibromohydrin, epiiodohydrin and the like. Amongst the dihalohydrins which can be used with the ammonia to form the initial resin to be used in modifying the urea-formaldehyde resin are the following: the dichlorohydrin, dibromohydrin, diiodohydrin and the like.

In the preparation of the urea-formaldehyde-ammonia-difunctional halohydrin resin, it is generally desired to react between 5-50 parts of the epihalohydrin resin solids with 100 parts of the urea in the urea-formaldehyde resin, and it is preferred that one react between 8-30 parts of the ammonia-halohydrin resin per 100 parts of urea in the urea-formaldehyde resin. If one were to use the ammonia-halohydrin resin in an amount less than about 5 parts per 100 parts of urea, the resultant resin would be too insoluble for use in the treatment of the regenerated cellulosic film.

Still further, if too much ammonia-halohydrin resin is used, say amounts appreciably greater than 50 parts ammonia-halohydrin resin per 100 parts of the urea in the urea-formaldehyde resin, the ultimate resinous composition would be too water-soluble for efficacious use in treating the cellulosic films.

The following example will illustrate the manner and method for the preparation of the urea-formaldehyde-ammonia-halohydrin resin.

*Urea-formaldehyde-ammonia-epichlorohydrin resin*

95 parts of an aqueous solution of an ammonia epichlorohydrin resin (50% solids) prepared according to Example "Resin Component A," set forth hereinabove, are introduced into a suitable reaction chamber equipped with thermometer, stirrer and reflux condenser. 189 parts of urea and 526 parts of neutral 37% formalin at a pH of 6.9-7.0 are introduced into the reaction chamber and the mixture is reacted at about 30° C. for 1 hour. The mixture is then heated to reflux and refluxing is continued at atmospheric pressure for an additional 1 hour period. The pH is adjusted to about 5.5-6.0. Agitation is continued throughout the reaction. After 1 hour of refluxing, the reaction mixture becomes dilutable in all proportions of water at room temperature. The refluxing is then discontinued and the resin solution may then be diluted to any desired solids concentration. The pH is finally adjusted to about 7-8 by the addition of an alkalizing agent in order to improve the stability of the solution.

Other obvious modifications in the preparation of the resin per se can be accomplished readily by any of those skilled in the art.

After the resin has been impregnated into the cellulosic film, it is desired to coat the film with a water-repellent topcoat. Amongst those water-repellent topcoats which may be used in the final treatment of the cellulosic films, after they have been subjected to impregnation by the resin dispersion, are those coating compositions containing, as the film-forming constituents, compounds such as cellulose nitrate, cellulose acetate, methyl cellulose, deacetylated chitin, rubber, chlorinated rubber, rubber hydrochloride, ethyl cellulose, butyl methacrylate and moisture-resistant lacquers and waxes such as montan, beeswax, carnauba, and other conventional film-forming coating materials. Some of these water-repellent coating compound formulations need no additional treatment after application. Some, however, may require a slight heating in order to get the coating to solidify.

The mol ratio of the urea to formaldehyde in the resinous compositions used in the practice of the process of the present invention can be varied over the conventional range, which is used in the preparation of urea-formaldehyde resins, such as urea to formaldehyde in a ratio of 1:1-1:4, respectively. It is, however, generally desired to keep the mol ratios of urea to formaldehyde within the range of 1:1.7-1:2.5, respectively.

I claim:

1. A process for treating non-fibrous regenerated cellulosic films comprising the steps of introducing said film into an aqueous dispersion of an urea-formaldehyde-ammonia-difunctional halohydrin-cationic resin and an aqueous solution of a plasticizing agent, removing the film, drying the film and applying thereto a water repellant topcoat.

2. A process for treating non-fibrous regenerated cellulosic film, comprising the steps of impregnating said film by introducing said film in an aqueous dispersion of an urea-formaldehyde difunctional halohydrin-ammonia thermosetting cationic resin, removing the film, incorporating therein a plasticizing agent, drying the film and applying thereto a water-repellent topcoat, wherein the weight ratio of the urea to the ammonia-halohydrin resin is about 1:0.05–1:0.5, respectively.

3. A process for treating non-fibrous regenerated cellulosic film comprising the steps of impregnating said film by introducing said film in an aqueous dispersion of an urea-formaldehyde difunctional halohydrin-ammonia thermosetting cationic resin, removing the film, incorporating therein a plasticizing agent, drying the film and applying thereto a water-repellent topcoat, wherein the weight ratio of the urea to the ammonia-halohydrin resin is about 1:0.05–1:0.5, respectively.

4. A process for treating non-fibrous regenerated cellulosic film comprising the steps of impregnating said film by introducing said film in an aqueous dispersion of an urea-formaldehyde-epichlorohydrin-ammonia thermosetting cationic resin, removing the film, incorporating therein a plasticizing agent, drying the film and applying thereto a water-repellent topcoat, wherein the weight ratio of the urea to the ammonia-chlorohydrin resin is about 1:0.05–1:0.5, respectively.

5. A process for treating non-fibrous regenerated cellulosic film comprising the steps of impregnating said film by introducing said film in an aqueous dispersion of an urea-formaldehyde-dihalohydrin-ammonia thermosetting cationic resin, removing the film, incorporating therein a plasticizing agent, drying the film and applying thereto a water-repellent topcoat, wherein the weight ratio of the urea to the ammonia-dihalohydrin resin is about 1:0.05–1:0.5, respectively.

6. A process for treating non-fibrous regenerated cellulosic film comprising the steps of impregnating said film by introducing said film in an aqueous dispersion of an urea-formaldehyde-dichlorohydrin-ammonia thermosetting cationic resin, removing the film, incorporating therein a plasticizing agent, drying the film and applying thereto a water-repellent topcoat, wherein the weight ratio of the urea to the ammonia-dichlorohydrin resin is about 1:0.05–1:0.5, respectively.

7. A process for treating non-fibrous regenerated cellulosic film comprising the steps of impregnating said film by introducing said film in an aqueous dispersion of an urea-formaldehyde-difunctional halohydrin-ammonia thermosetting cationic resin, removing the film, incorporating therein a plasticizing agent, drying the film and applying thereto a water-repellent topcoat, wherein the weight ratio of the urea to the ammonia-halohydrin resin is about 1:0.08–1:0.3, respectively.

8. A process for treating non-fibrous regenerated cellulosic film comprising the steps of impregnating said film by introducing said film in an aqueous dispersion of an urea-formaldehyde-epihalohydrin-ammonia thermosetting cationic resin, removing the film, incorporating therein a plasticizing agent, drying the film and applying thereto a water-repellent topcoat, wherein the weight ratio of the urea to the ammonia-epihalohydrin resin is about 1:0.08–1:0.3, respectively.

9. A process for treating non-fibrous regenerated cellulosic film comprising the steps of impregnating said film by introducing said film in an aqueous dispersion of an urea-formaldehyde-epichlorohydrin-ammonia thermosetting cationic resin, removing the film, incorporating therein a plasticizing agent, drying the film and applying thereto a water-repellent topcoat, wherein the weight ratio of the urea to the ammonia-epichlorohydrin resin is about 1:0.08–1:0.3, respectively.

10. A process for treating non-fibrous regenerated cellulosic film comprising the steps of impregnating said film by introducing said film in an aqueous dispersion of an urea-formaldehyde-dihalohydrin-ammonia thermosetting cationic resin, removing the film, incorporating therein a plasticizing agent, drying the film and applying thereto a water-repellent topcoat, wherein the weight ratio of the urea to the ammonia-halohydrin resin is about 1:0.08–1:0.3, respectively.

11. A process for treating non-fibrous regenerated cellulosic film comprising the steps of impregnating said film by introducing said film in an aqueous dispersion of an urea-formaldehyde-dichlorohydrin-ammonia thermosetting cationic resin, removing the film, incorporating therein a plasticizing agent, drying the film and applying thereto a water-repellent topcoat, wherein the weight ratio of the urea to the ammonia-dichlorohydrin resin is about 1:0.08–1:0.3, respectively.

12. A process for treating non-fibrous regenerated cellulosic film comprising the steps of impregnating said film by introducing said film in an aqueous dispersion of an urea-formaldehyde-difunctional halohydrin-ammonia thermosetting cationic resin containing 0.1–3% of said resin, removing the film, incorporating therein a plasticizing agent, drying the film and applying thereto a water-repellent topcoat, wherein the weight ratio of the urea to the ammonia-halohydrin resin is about 1:0.05–1:0.5, respectively.

13. A process for treating non-fibrous regenerated cellulosic film comprising the steps of impregnating said film by introducing said film in an aqueous dispersion of an urea-formaldehyde-epihalohydrin-ammonia thermosetting cationic resin containing 0.1–3% of said resin, removing the film and applying thereto a water-repellent topcoat, wherein the weight ratio of the urea to the ammonia-epihalohydrin resin is about 1:0.05–1:0.5, respectively.

14. A process for treating non-fibrous regenerated cellulosic film comprising the steps of impregnating said film by introducing said film in an aqueous dispersion of an urea-formaldehyde-epichlorohydrin-ammonia thermosetting cationic resin containing 0.1–3% of said resin, removing the film, incorporating therein a plasticizing agent, drying the film and applying thereto a water-repellent topcoat, wherein the weight ratio of the urea to the ammonia-epichlorohydrin resin is about 1:0.05–1:0.5, respectively.

15. A process for treating non-fibrous regenerated cellulosic film comprising the steps of impregnating said film by introducing said film in an aqueous dispersion of an urea-formaldehyde-dihalohydrin-ammonia thermosetting cationic resin containing 0.1–3% of said resin, removing the film, incorporating therein a plasticizing agent, drying the film and applying thereto a water-repellent topcoat, wherein the weight ratio of the urea to the ammonia-dihalohydrin resin is about 1:0.05–1:0.5, respectively.

16. A process for treating non-fibrous regenerated cellulosic film comprising the steps of impregnating said film by introducing said film in an aqueous dispersion of an urea-formaldehyde-dichlorohydrin - ammonia thermosetting cationic resin containing 0.1–3% of said resin, removing the film, incorporating therein a plasticizing agent, drying the film and applying thereto a water repellent topcoat, wherein the weight ratio of the urea to the ammonia-dichlorhydrin resin is about 1:0.05–1:0.5, respectively.

17. A non-fibrous cellulosic film impregnated with a partially polymerized thermosetting cationic urea-formaldehyde-ammonia difunctional halohydrin resin and coated with a water-repellent topcoat.

18. The product in claim 17 in which the resin is a cationic urea-formaldehyde-ammonia-epichlorohydrin resin.

19. The product of claim 17 in which the resin is a urea-formaldehyde-ammonia-dichlorohydrin resin.

References Cited in the file of this patent

UNITED STATES PATENTS

| Number | Name | Date |
| --- | --- | --- |
| 2,546,575 | Wooding | Mar. 27, 1951 |
| 2,573,957 | Daniel | Nov. 6, 1951 |

FOREIGN PATENTS

| Number | Country | Date |
| --- | --- | --- |
| 590,698 | Great Britain | July 25, 1947 |
| 112,996 | Australia | Apr. 28, 1941 |